United States Patent
Yu et al.

(10) Patent No.: US 7,598,754 B2
(45) Date of Patent: Oct. 6, 2009

(54) INPUT DETECTING CIRCUIT USED FOR ELECTRIC-LEAKAGE PROTECTION DEVICES WITH SELF-DIAGNOSTIC FUNCTION

(75) Inventors: Jun Yu, Shanghai (CN); Qikang Chen, Shanghai (CN)

(73) Assignee: Shanghai Fudan Microelectronics Co., Ltd., Shanghai (CN)

( * ) Notice: Subject to any disclaimer, the term of this patent is extended or adjusted under 35 U.S.C. 154(b) by 15 days.

(21) Appl. No.: 11/764,588

(22) Filed: Jun. 18, 2007

(65) Prior Publication Data

US 2008/0048667 A1 Feb. 28, 2008

(30) Foreign Application Priority Data

Aug. 24, 2006 (CN) .................... 2006 1 0030341

(51) Int. Cl.
*G01R 27/08* (2006.01)
*H02H 3/00* (2006.01)

(52) U.S. Cl. .................... 324/713; 361/42

(58) Field of Classification Search ............ 324/713, 324/691, 649, 600, 522, 424, 500, 512, 415–423, 324/536, 555, 76.11, 158.1; 361/42, 1, 102, 361/109, 114, 115
See application file for complete search history.

(56) References Cited

U.S. PATENT DOCUMENTS

| | | | | |
|---|---|---|---|---|
| 3,579,219 A | * | 5/1971 | Wolfframm | 340/651 |
| 4,024,436 A | * | 5/1977 | Adams | 361/45 |
| 5,638,057 A | * | 6/1997 | Williams | 340/947 |
| 6,262,871 B1 | * | 7/2001 | Nemir et al. | 361/42 |
| 6,831,819 B2 | * | 12/2004 | Nemir et al. | 361/42 |
| 2008/0170341 A1 | * | 7/2008 | Huang et al. | 361/42 |

* cited by examiner

*Primary Examiner*—Hoai-An D Nguyen
(74) *Attorney, Agent, or Firm*—Lowe Hauptman Ham & Berner

(57) ABSTRACT

An input detecting circuit for an electric-leakage protection device with self-diagnostic function includes an analog electric-leakage unit, a magnetic electric-leakage induction ring, an operational amplifier, and an inverse feedback circuit. The inverse feedback circuit includes a first resistance and a second circuit unit shunted with the first resistance. The second circuit unit includes a second resistance and a unidirectional break-over unit connected in series with the second resistance.

2 Claims, 3 Drawing Sheets

INPUT DETECTING CIRCUIT USED FOR ELECTRIC-LEAKAGE PROTECTION DEVICES WITH SELF-DIAGNOSTIC FUNCTION

CROSS REFERENCE

This application is based on, and claims priority from Chinese Application No. 200610030341.9, filed Aug. 24, 2006, the disclosure of which is hereby incorporated by reference herein in its entirety.

TECHNICAL FIELD

This disclosure relates to a detecting circuit, especially relates to an input detecting circuit used for ground fault electric-leakage protection devices with self-diagnostic function.

BACKGROUND

Ground Fault Circuit Interrupter (GFCI) is a ground fault electric-leakage protection device to protect from accidents of electric shock when electricity is used at wet occasions, such as kitchen, toilet and basement, etc. in ordinary residential houses. According to the stipulation of National Electrical Code of USA, at least 8 such devices need to be mounted in an ordinary medium-sized suite, and need to be changed once every two years. In other words, the annual demand of GFCI in the United States is more than 20 million devices with a total market price of more than USD 3 billion. The safety standard of the above mentioned product must be in accordance with the authentication requirement of UL (Laboratory of Insurance Co.) in USA. The authentication organization of UL has declared that GFCI electric-leakage protection devices with self-diagnostic protection function should be widely put in use as of 28 Jun. 2006 in USA. The product has self-diagnostic function in real time, and can detect whether or not the electric-leakage protection circuit is in normal working state. Once the circuit has trouble, alarming signal in the form of sound or light, etc. will be given.

Normally, an integrated-circuit, e.g. integrated-circuit FM2145, FM2141, etc., is used as the core component of GFCI products. Now such integrated-circuit has already been widely used. But GFCI circuit by using of existing GFCI integrated-circuit is designed based upon the former UL standard, and does not comply with the application of the new standard mentioned above. Thus, the present design is required to satisfy the requirement of that new standard. Generally speaking, GFCI electric-leakage protection device with self-diagnostic function needs a circuit to produce an artificial emulation leakage current. When the emulation leakage current passes through a magnetic leakage current detecting ring, the current at the input end of the electric-leakage detecting circuit will be induced by the magnetic leakage current detecting ring, thus to trigger the electric-leakage protection circuit to handle that emulation leakage current. Each output end of the electric-leakage protection circuit will be detected by the self-diagnostic circuit to determine whether or not the electric-leakage protection circuit is working properly. Normally, the leakage current produced by that circuit will be caused at the time when GFCI tripping mechanism can not be initiated, otherwise the regular protection function will be interrupted. Therefore, the emulation leakage current is usually unidirectional in nature, i.e., it only has one direction, and the signal shall have a direct current (DC) component. But due to the addition of the emulation leakage current, when an actual leakage current is caused, the emulation leakage current will be superimposed on the actual leakage current, due to the unidirectional nature of that emulation leakage current, the influence of forward and backward leakage currents caused by the actual leakage current will be different. Accordingly, after superimposing, the magnitudes of the leakage currents at forward and backward directions will be different and that the sensitivity of GFCI product is different when measuring from different directions of the leakage currents. Therefore, it does not comply with the consistency requirement of leakage currents at forward and backward directions stipulated by the UL standard. For example, when the emulation leakage current is superimposed on backward leakage current, as a result, the sensitivity of forward leakage current will be comparatively low and the sensitivity of backward leakage current will be comparatively high.

SUMMARY

In an aspect this invention offers a kind of input detecting circuit used for electric-leakage protection devices with self-diagnostic function. It can solve the un-uniform problem of forward and backward electric-leakage sensitivity caused due to the addition of an emulation leakage current for unidirectional detection to the ground electric-leakage protection device with self-diagnostic function, and enables the GFCI electric-leakage protection with self-diagnostic function to meet the requirement of forward and backward electric-leakage sensitivity stipulated by the UL standard.

In order to reach the above-mentioned goal an embodiment of, this invention offers a kind of input detecting circuit used for an electric-leakage protection device with self-diagnostic function, including an emulation electric-leakage unit, a magnetic leakage current detecting ring and an amplifying circuit. Furthermore, it has the characteristic of having also a negative feedback circuit.

One end of the emulation electric-leakage unit is connected to a forward current, while the other end is connected to a backward current. The emulation electric-leakage device will produce a unidirectional emulation current to superimpose on the actual leakage current.

When the magnetic leakage current detecting ring passes through the forward and backward currents, the input current of the electric-leakage protection circuit will be induced and then the current will output to the amplifying circuit.

The amplifying circuit is connected with the magnetic leakage current detecting ring, and then outputs the amplified input forward and backward electric-leakage currents through said amplifying circuit.

One end of the negative feedback circuit is connected to the input end of a negative terminal of said amplifying circuit, and the other end is connected to the output end of said amplifying circuit. The negative feedback circuit contains a first resistance, and a second circuit unit, shunted with the first resistance.

The second circuit unit contains a second resistance and at least a unidirectional conductive unit, which is connected in series with the second resistance.

In further embodiments, the conductive unit contains several unidirectional conductive elements such as a diode, or a diode of BC (base and collector) junction of a triode, or a diode of BE (base and emitter) junction of a triode.

In further embodiments, the resistance value of the negative feedback circuit varies with the forward and backward currents, thus producing different amounts of feedback.

In further aspects, when the actual electric-leakage is caused, the output end of the magnetic leakage current detecting ring has the current which is superimposed by the actual electric-leakage $I_1$ and the emulation electric-leakage $I_d$. Suppose that the magnitude of the actual electric-leakage $I_1$ is $I_{lm}$, and the emulation electric-leakage $I_d$ has the same forward direction and has a magnitude $I_{dm}$, thus the forward current at the output end is $I_f = I_{lm} + I_{dm}$, and the backward current at that end is $I_r = I_{lm}$. Due to different forward and backward resistance characteristics in the negative feedback circuit, when the forward current inputs to the operational amplifier, the feedback amount is decided by the forward resistance $R_f$, thus the output voltage of the operational amplifier $V_f = -I_f * R_f$, i.e. $V_f = -(I_{lm} + I_{dm}) * R_f$. When the backward current inputs to the operational amplifier (O.A.), the feedback amount is decided by the backward resistance $R_r$, thus the output voltage of O.A $V_r = -I_r * R_r$, i.e. $V_r = -I_{lm} * R_r$. Due to the superimposed emulation electric-leakage, the magnitudes of forward and backward currents input to O.A. are not the same, but if one adjusts the forward resistance $R_f$ and backward resistance $R_r$ in the feedback circuit, and enables the magnitudes of the output of O.A. $V_f = -I_f * R_f$ to be the same as that of $V_f = -(I_{lm} + I_{dm}) * R_f$, then the influence of un-uniform output magnitudes caused by the superimposed emulation electric-leakage can be compensated for.

DETAILED DESCRIPTION OF EMBODIMENTS

Figure 1:
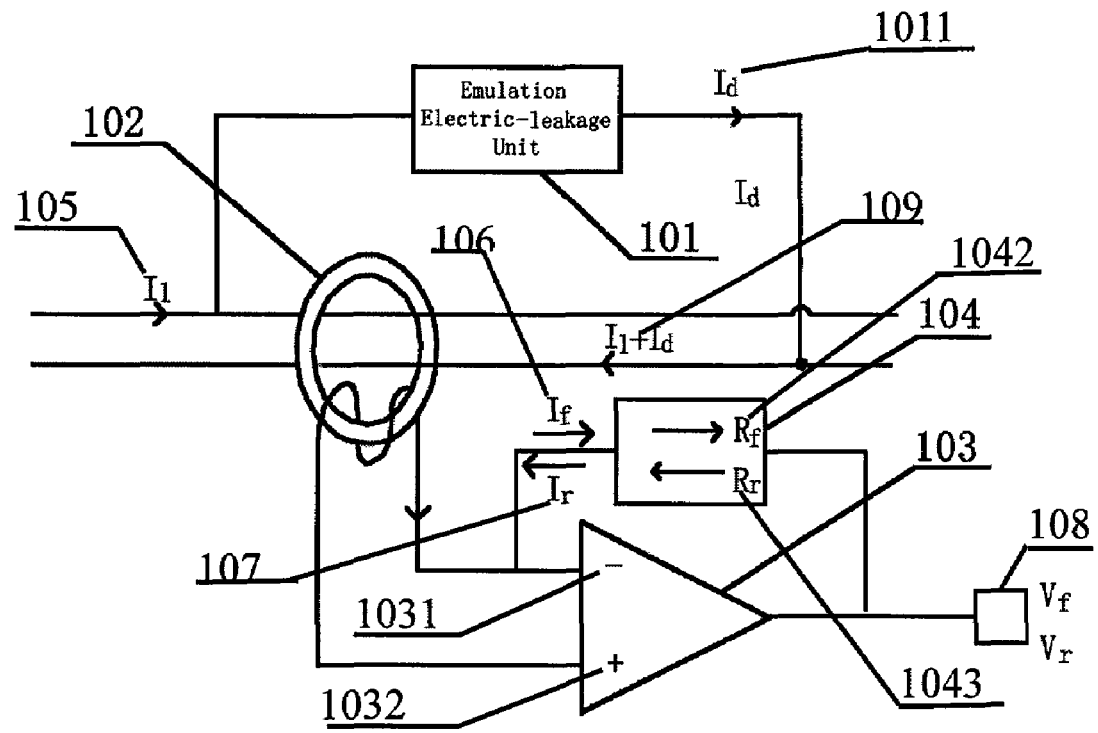
FIG. 1 is the structure scheme of an input detecting circuit used for a kind of electric-leakage protection device with self-diagnostic function in accordance with an embodiment of this invention.

As FIG. 1 shows, an input detecting circuit used for an electric-leakage protection device with self-diagnostic function is provided, containing emulation electric-leakage unit 101, magnetic leakage current detecting ring 102 and amplifying circuit 103. The characteristic lies in that it also has a negative feedback circuit 104.

One end of the above-mentioned emulation electric-leakage unit 101 is connected with a forward current 105, while the other end is connected with a backward current 109. A unidirectional leakage current 1011 produced by that emulation electric-leakage unit 101 will be superimposed on the actual leakage current 109.

The input current of the electric-leakage detecting circuit is induced by the magnetic leakage current detecting ring 102 after it passes through the forward and backward currents, and outputs the induced current to the amplifying circuit 103.

The amplifying circuit 103 is connected with the magnetic leakage current detecting ring 102, and then outputs the input forward 106 and backward leakage currents 107 after amplifying the currents.

One end of the negative feedback circuit 104 is connected with the input end 103 of a negative terminal of the amplifying circuit 103, while the other end is connected with the output end 108 of the amplifying circuit 103. The negative feedback circuit 104 contains the first resistance $R_1$, 1046 and the second resistance $R_2$ 1045 paralleled with the first resistance.

The second circuit unit contains the second resistance $R_2$ 1045, and a unidirectional conductive unit 1041 connected in series with the second resistance 1045.

Figure 2:
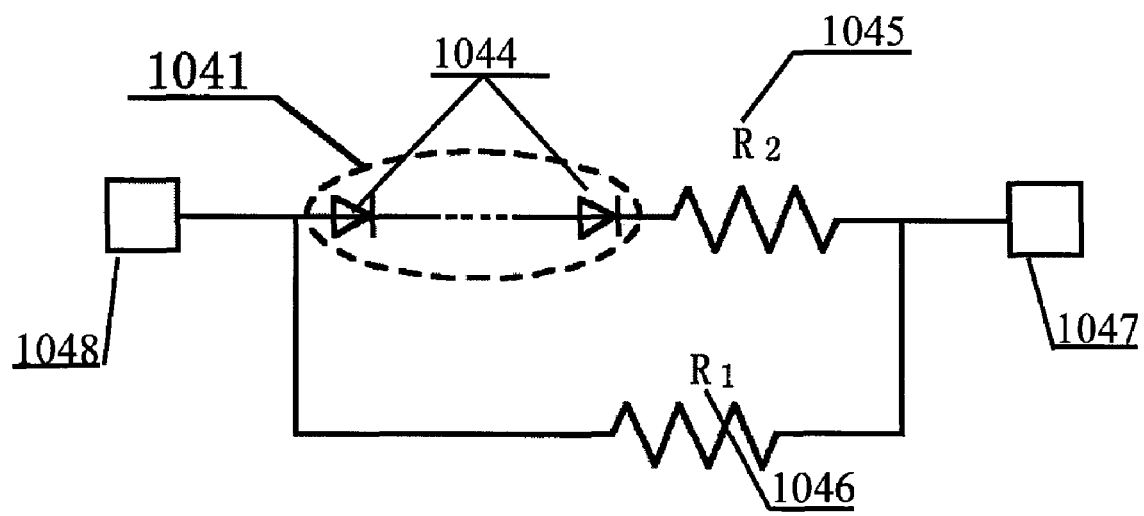
FIG. 2 is the structure scheme of a negative feedback circuit for an input detecting circuit used for a kind of electric-leakage protection device with self-diagnostic function in accordance with an embodiment of this invention.
Figure 3:
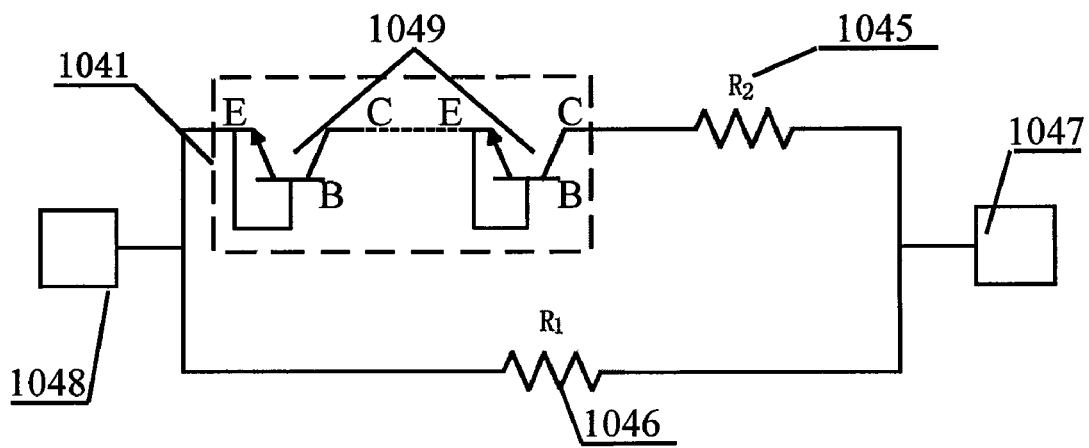
FIG. 3 is the structure scheme of a negative feedback circuit for an input detecting circuit used for a kind of electric-leakage protection device with self-diagnostic function in accordance with an embodiment of this invention.
Figure 4:
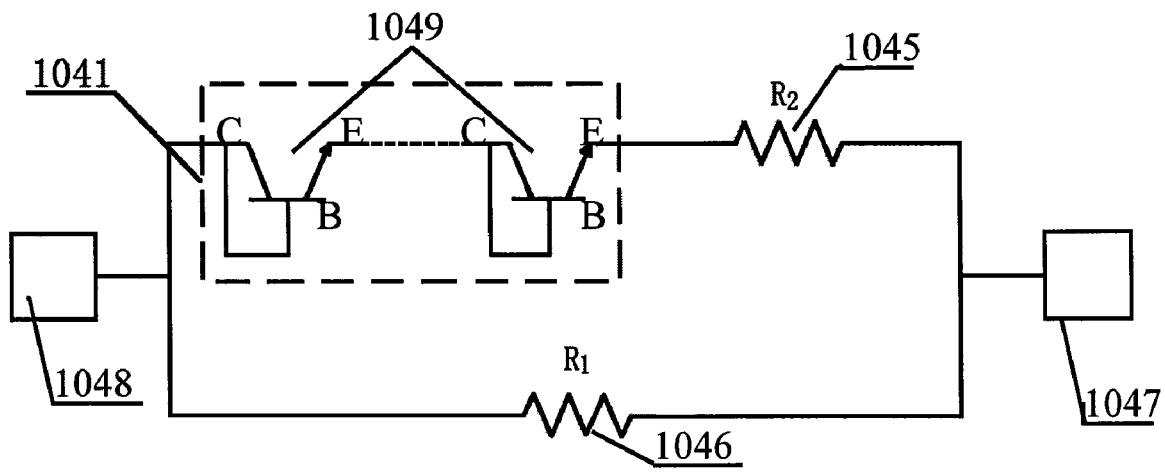
FIG. 4 is the structure scheme of a negative feedback circuit for an input detecting circuit used for a kind of electric-leakage protection device with self-diagnostic function in accordance with an embodiment of this invention.

The conductive unit 1041 contains several unidirectional conductive elements including diode(s) 1044 (as shown in FIG. 2), or diode(s) of BC (base and collector) junction of triode(s) 1049 (as shown in FIG. 3), or diode(s) of BE (base and emitter) junction of triode(s) 1049 (as shown in FIG. 4).

The resistance value of the negative feedback circuit 104 may vary with the forward current 106 or backward current 107; thus causing different feedback amounts.

Figure 5:
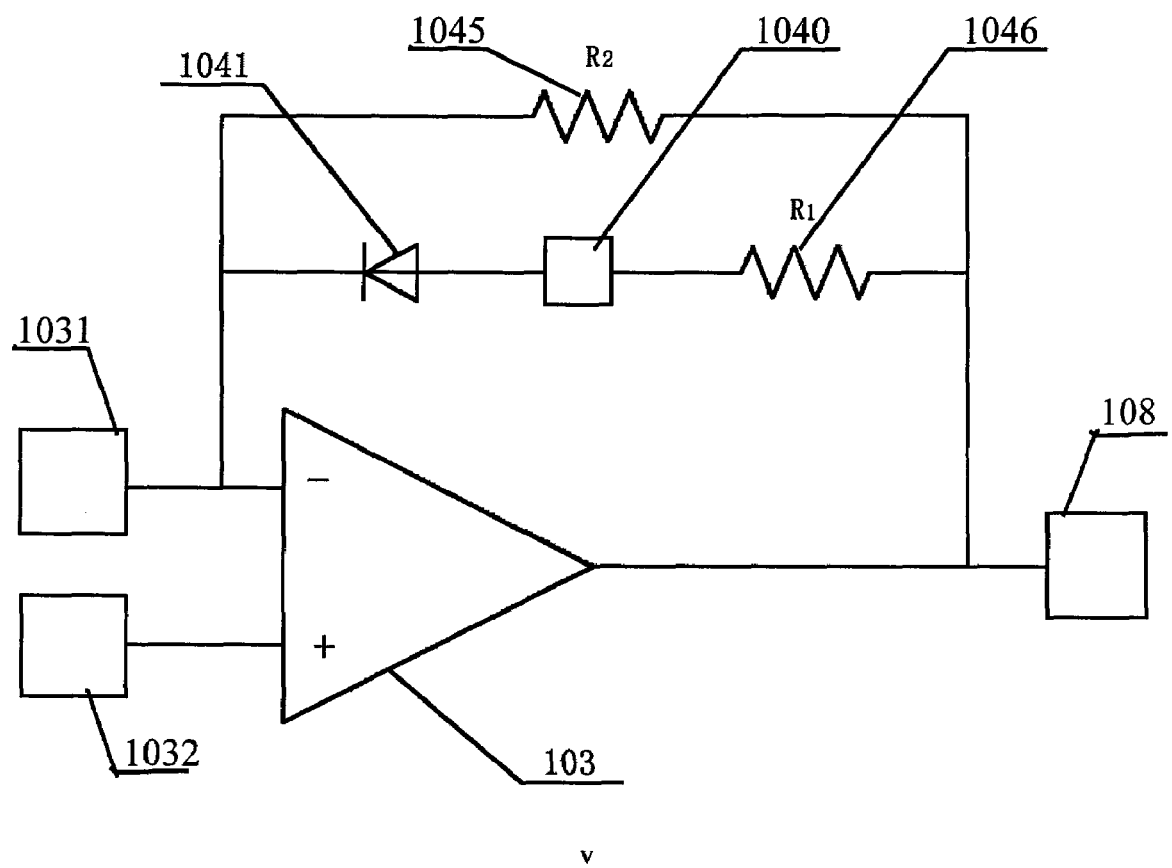
FIG. 5 is the structure scheme for one concrete example of a negative feedback circuit for an input detecting circuit used for a kind of electric-leakage protection device with self-diagnostic function in accordance with an embodiment of this invention.

As shown in FIG. 5, when the direction of the emulation leakage current is the same as that of the backward current, thus the forward current at output end is $I_f = I_{lm}$. And the backward current is $I_r = I_{lm} + I_{dm}$. Due to different forward and backward resistance properties in the negative feedback circuit, when the forward current is input to the operational amplifier, the feedback amount is decided by the forward resistance 1042 $R_f = R_1$, thus the output voltage of the operational amplifier $V_f = -I_f * R_f$, i.e., $V_f = -I_{lm} * R_1$. When the backward current is input to the operational amplifier, the feedback amount is decided by the backward resistance 1043 $R_r = R_1 * R_2 / (R_1 + * R_2)$, thus the output voltage of O.A $V_f = -I_r * R_r$, i.e., $V_f = -(I_{lm} + I_{dm}) * [R_1 * R_2 / (R_1 + * R_2)]$. If the forward electric-leakage sensitivity is half of the backward electric-leakage sensitivity, then take $R_1 = R_2$, the forward and backward electric-leakage sensitivity is just compensated to reach the aim of providing the same magnitude to forward and backward outputs. The box marked with 1040 in FIG. 5 represents the connection point between the diode 1041 and the resistor 1046.

The described and other embodiments of the invention offer a detecting circuit used for an electric-leakage protection device with self-diagnostic function which can solve the problem of un-uniform sensitivity of forward and backward electric-leakage caused due to the addition of an emulation leakage current for unidirectional detection to the ground fault electric-leakage protection device with self-diagnostic function, and enables such GFCI electric-leakage protection with self-diagnostic function to comply with the same forward and backward electric-leakage sensitivity required by the UL standard.

The invention claimed is:

1. An input detecting circuit for an electric-leakage protection device with self-diagnostic function, comprising:
    an emulation electric-leakage unit,
    a magnetic leakage current detecting ring,
    an amplifying circuit, and
    a negative feedback circuit; wherein:
        one end of said negative feedback circuit is connected with an input end of a negative terminal of said amplifying circuit, and the other end is connected with an output end of said amplifying circuit;
        said negative feedback circuit contains a first resistance and a second circuit unit parallel with said first resistance;

said second circuit unit contains a second resistance and a unidirectional conductive unit connected in series with the second resistance;

said conductive unit contains at least one unidirectional conductive element.

2. An input detecting circuit as set forth in claim 1, wherein one end of said emulation electric-leakage unit is connected with a forward current, while the other end is connected with a backward current, and the emulation electric-leakage unit is adapted to produce a unidirectional emulation leakage current, which is superimposed to an actual leakage current.

* * * * *